Oct. 5, 1943.        D. W. ALCOTT        2,330,857
LIQUID MEASURING AND INDICATING APPARATUS AND SYSTEM THEREFOR
Filed Sept. 26, 1939        2 Sheets-Sheet 1
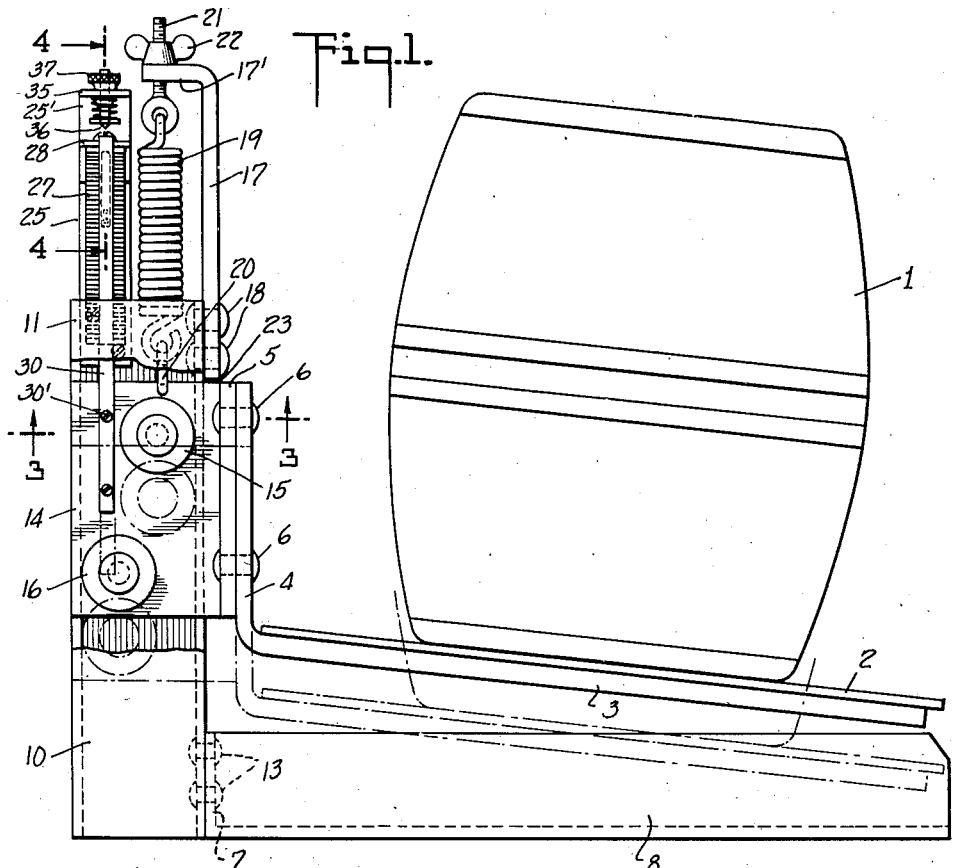
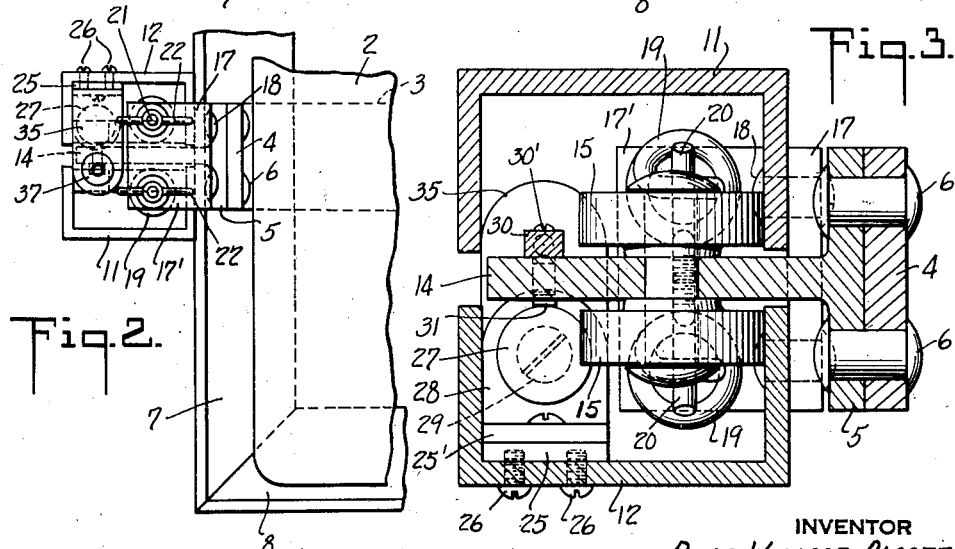
INVENTOR
DAVID WALLACE ALCOTT
BY
ATTORNEYS Oct. 5, 1943.                    D. W. ALCOTT                    2,330,857
        LIQUID MEASURING AND INDICATING APPARATUS AND SYSTEM THEREFOR
                    Filed Sept. 26, 1939        2 Sheets-Sheet 2
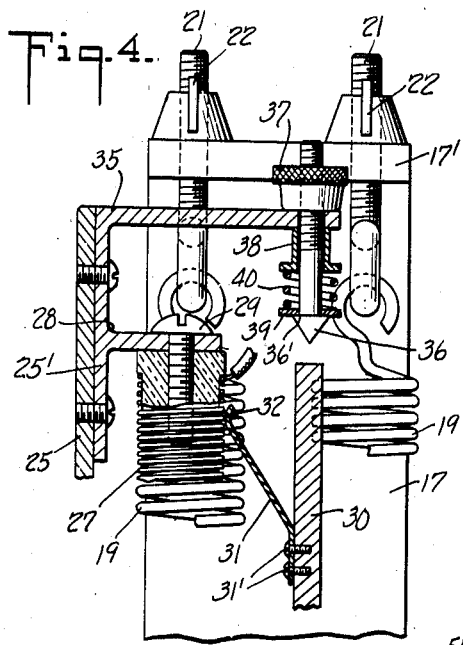
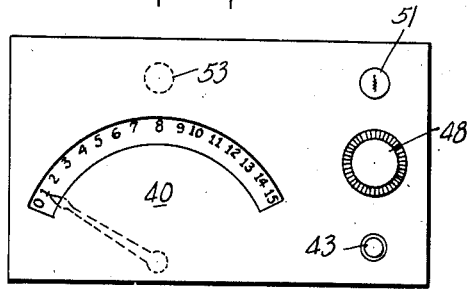
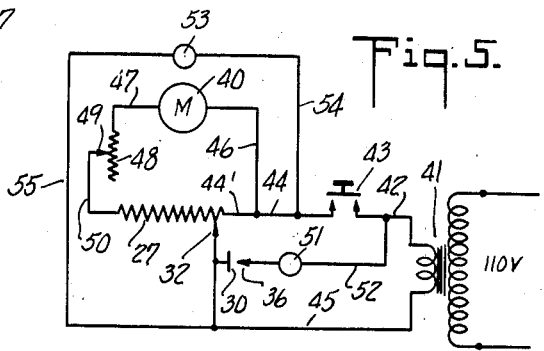
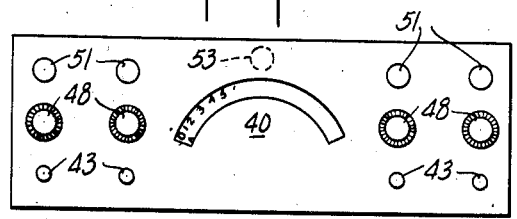
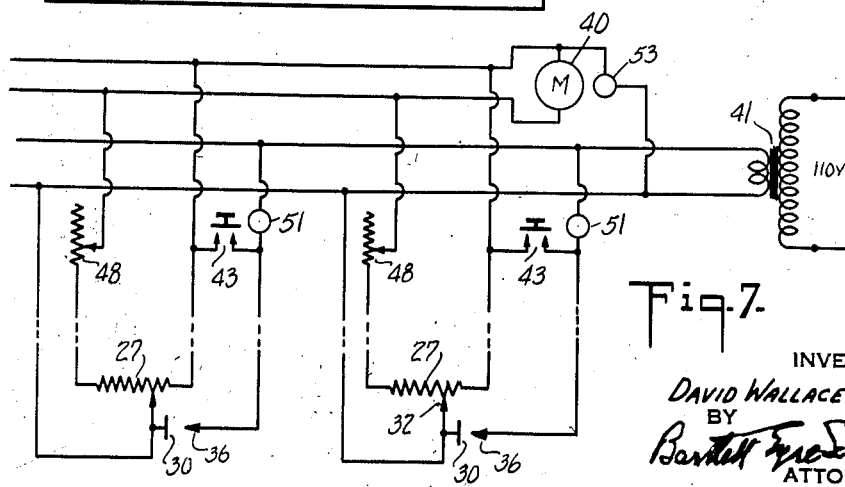
INVENTOR
DAVID WALLACE ALCOTT
BY
ATTORNEYS Patented Oct. 5, 1943

2,330,857

UNITED STATES PATENT OFFICE 2,330,857

LIQUID MEASURING AND INDICATING APPARATUS AND SYSTEM THEREFOR

David Wallace Alcott, Newark, N. J.

Application September 26, 1939, Serial No. 296,529

9 Claims. (Cl. 265—27)

This invention relates to means for measuring and indicating the quantity of beer and other consumable liquids remaining in kegs or receptacles as the liquids are gradually dispensed to consumers.

An object of the invention is a novel and simplified apparatus and system, whereby the dispenser of beer and the like to the consuming public may at a glance ascertain the quantity of remaining beer or the like in the kegs or other receptacles in which it is contained.

A further object of the invention is a novel and simplified apparatus of the character above indicated for automatically indicating to the dispenser when the beer or the like in the receptacle is about to be depleted.

A further object of the invention is a novel and improved apparatus and system of the above indicated character which measures and indicates the quantity of beer and the like contained in the receptacle, responsively to the weight of the receptacle and the contained liquid and particularly such an apparatus and system which is readily usable with receptacle casings of different weights accurately to measure and indicate the volume of liquid contained therein.

A further object of the invention is a novel and improved apparatus and system of the above indicated character comprising combined mechanical and electrical devices correlated and associated together to accomplish the indicated objects.

A further object of the invention is an apparatus and system of the above indicated character which is characterized by its simplicity in construction and operation and by low cost in manufacture and assembly thereof.

Further objects of the invention will hereinafter appear.

For a better understanding of the invention reference may be had to the accompanying drawings forming a part of this application wherein:

Fig. 1 is a side view of a part of the apparatus and system embodying the invention, with certain parts broken away;

Fig. 2 is a plan view of a portion of the apparatus;

Fig. 3 is a sectional view along the line 3—3 of of Fig. 1;

Fig. 4 is a sectional view along the line 4—4 of Fig. 1;

Fig. 5 is an electrical diagram indicating the cooperating electrical features;

Fig. 6 is a panel or instrument board corresponding to the circuit of Fig. 5;

Fig. 7 is a diagram or electrical circuit used with a multiple number of receptacles; and Fig. 8 is an instrument board corresponding to the electrical diagram of Fig. 7.

Referring to Figs. 1 to 4, I have illustrated the mechanical features of my apparatus and system for measuring and indicating the quantity of beer or other consumable liquid contained in a keg or barrel 1. The keg or barrel 1 rests upon a platform 2, preferably, but not necessarily, inclined as shown in the drawings. This platform 2 is mounted upon and carried by a flat frame member 3 and the latter in turn is provided with an angle 4 which is firmly fastened to a vertically movable carriage frame 5, this being fastened in any suitable manner, as, for example, by the rivets or bolts 6. The frame for the apparatus comprises a base formed of an end L-angle member 7 and two side L-angle members 8 rigidly fastened in any suitable manner to the ends of the end member 7, only one of the side members 8 being shown in the drawings for convenience in illustration. A vertical guide frame track for the carriage 5 is indicated generally at 10. This comprises a pair of channel members 11 and 12 slightly spaced from each other with the channels facing each other and these vertical channel members are rigidly fastened at their lower ends to the base member 7 in any suitable manner, as, for example, by means of the rivets or bolts 13 indicated.

The frame of the carriage 5 comprises a T member having a web 14 which projects into the space between the two channel members 11 and 12 and on this web are mounted two pairs of rollers, an upper pair of rollers 15 and a lower pair of rollers 16, which are offset and spaced from each other both vertically and horizontally. The pair of rollers 15 are journalled on a shaft passing through the web 14 and engage and follow the inner webs of the channels 11 and 12 as a track, these rollers 15 being mounted near the upper edge of the frame web 14. The other pair of rollers 16 are mounted near the lower end of the web 14 and nearer the outer edge thereof and these rollers follow the outer webs of the channel members 11 and 12 as a guide track. A vertically extending bracket member 17 is fastened at its lower end to the inner webs of the channels 11 and 12 in any suitable manner, as, for example, by means of the rivets or bolts 18. This bracket 17 is bent over at its upper end to form a horizontal part 17' and the carriage frame 5, 14 is suspended from this upper part 17' by means of a pair of springs 19. The lower ends of these springs are fastened to the web 14 in any suitable manner, as, for example, by means of the eye bolt members 20 which are fastened to the web 14. The upper ends of these springs are fastened to the supporting part 17' by means of the eye bolts 21 having adjustable wing nuts 22 thereon for adjusting the height of the eye bolts. The lower end 23 of the supporting bracket member 17 forms a limiting stop for the upward movement of the carriage 5. The platform 2 and the carriage 5 are thus suspended by the coil springs 19, and the weight of the keg or barrel 1 together with its contents determines the vertical position of the carriage 5.

A bracket member 25 extends upwardly from the channel member, the lower end of the bracket member 25 being fastened in any suitable manner to the channel member, as, for example, by the screw bolts 26. The bracket member 25 carries at its upper end a rheostat 27, this rheostat being of any conventional form and in the particular embodiment shown being carried from an auxiliary bracket 25' having an arm 28 to the under side of which the rheostat 27 is fastened by means of a screw bolt 29. This rheostat 27 is adjustably controlled by the carriage 5 and for this purpose an upwardly extending control arm 30 is fastened at its lower end to the web 14 of the carriage frame, in the particular embodiment shown this arm 30 being fastened to the web 14 by means of bolts 30'. The vertically extending arm 30 is provided with a contact member 31 which is fastened thereto in any suitable manner, as, for example, by the bolts 31'. The free end 32 of the contact arm 31 slides upwardly and downwardly in contact with the elongated rheostat 27 to vary, as hereinafter described, the resistance included in the circuit controlled by the position of the carriage 5. The auxiliary bracket 25' is also provided with an arm 35 which, at a point adjacent its free end, carries a contact 36 above and in alinement with the movable arm 30. The contact 36 is carried on the end of a bolt which projects up through the arm 35 and is adjustably engaged by a screw nut 37 above the arm 35. Contact 36 is insulated in any suitable manner from the bracket 35 and electrically connected to a signal lamp as hereinafter described in connection with Figure 5. A sleeve 38 surrounds the contact bolt and is disposed below the arm 35, and a washer 39 also surrounds the bolt and is held against a shoulder 36' formed on the contact 36 by means of a spring 40. By adjusting the nut 37 up and down, the height of the contact 36 may be adjusted, and by means of the compression spring 40, which is disposed between the sleeve 38 and the washer 39, the contact 36 together with its carrying bolt may be yieldingly moved upwardly against the tension of the spring 40 when the arm 30 engages it.

Referring to Figs. 5 and 6 an electric meter 40 is shown which is connected across the power supply circuit in series with adjustable resistances 27 and 48. In the particular embodiment shown the power circuit includes a transformer 41 which receives the house lighting voltage (alternating current) and reduces it to the required low value to be supplied to the meter M and the resistances 27 and 48. The circuit from the secondary of the transformer leads through a conductor 42, a control switch 43, conductors 44 and 44' to one end of the resistance 27, thence through that part of the resistance 27 connected across the secondary of the transformer through the contact 32 to the frame of the machine and back through the conductor 45 to the other side of the transformer secondary. The meter 40 is connected on one side by means of a conductor 46 with conductor 44 and is connected on the other side by means of a conductor 47 leading to the adjustable resistance or rheostat 48 and thence through the adjustable contact 49 and conductor 50 to the end of the resistance 27. Thus, the meter 40 is connected in series with the resistance 48 and that part of the resistance 27 which is not connected across the secondary of the transformer and across the transformer secondary or power supply line. The contact 36 controls the circuit of a signal lamp 51 which is connected across the secondary of the transformer by means of a conductor 52, contacts 30 and 36, and the line 45. An incandescent lamp 53 is connected across the secondary of the transformer through a conductor 54, a conductor 55 and the conductor 45 which light is controlled by the switch 43 and illuminates the dial of the meter 40.

Fig. 6 indicates diagrammatically the instrument board and it is observed that the scale of the meter 40 is calibrated to read in gallons of beer or liquid contents contained in the keg or barrel 1. In the particular embodiment shown the meter is calibrated to read 15 gallons which is the quantity contained in the standard one-half barrel of beer. When the barrel or keg 1 of beer is placed upon the platform 2 the springs 39 are expanded or extended and the platform and the carriage 5 descend guided by the rollers 15 and 16. This descent of the carriage carries the arm 30 and the resistance varying contact 32 downwardly with it to increase the resistance of the rheostat 27 which is connected across the secondary of the transformer and at the same time decrease that part of resistance 27 which is connected in series with the meter 40. Upon the closure of the switch 43 by the salesman, the meter 40 and the resistance 27 are simultaneously connected in circuit and the meter will then indicate the quantity of beer, say 15 gallons, contained in the keg. The dial illuminating lamp 53 is simultaneously connected in circuit to illuminate the meter. As the beer or liquid is consumed the platform 2 and carriage 5 are pulled upward by the springs 19 and the contact 32 simultaneously gradually decreases the resistance of rheostat 27 which is connected across the secondary of the transformer and simultaneously increases the resistance in the meter circuit and the quantities contained in the keg or barrel 1 may be determined at any time by the salesman or user by simply closing the switch 43. When the beer or liquid has been consumed within the limits determined by the user, by the setting of the variable contact 36 for any predetermined setting of the eye bolts 21, the carrying arm 30 engages the contact 36 to light up the signal lamp 51, thereby warning the user or operator that the quantity of beer or other liquid in the keg has reached the predetermined point.

Due to the variation in the weight of the commercial kegs or barrels 1, it is desirable to correct for these different weights of these empty kegs which are to be used. This is readily effected by putting the empty keg or barrel upon the platform 2 and then adjusting the rheostat 48 until the meter 40 reads zero. This rheostat 48 is conveniently placed adjacent the operator or beer dispenser or user, as, for example, on the instrument board carrying the meter so that corrections for kegs of different weights may be readily made at any time. With the corrections for weights of kegs thus made the meter 40 will, with the circuit shown, accurately measure and indicate the quantity of liquid contained in the barrel. The switch 43 and the lights 51 and 53 are also preferably contained on the instrument board as shown in Fig. 6.

I have shown in Figs. 7 and 8 my invention as applied to the use of a multiple number of barrels or kegs 1, in the particular embodiment shown, four of such kegs. There is, therefore, provided for each of the kegs or barrels 1 a mechanism as set forth in Figs. 1, 2 and 4. A single meter 40 with a dial illuminating lamp 53 may be used for all of the kegs, but for each of the kegs is provided separate signal lamp 51, correcting rheostat 48 for correcting for difference in weight of kegs and control switch 43. Fig. 8 indicates the instrument board and Fig. 7 indicates the circuits. It is understood, of course, that only one of the control switches 43 is closed at a time. In the particular embodiment of Figs. 7 and 8 the barrels or kegs 1 and their corresponding measuring devices may be disposed in the room below the sales or dispensing room while the meter 40 and all the other devices shown on the instrument board are disposed in the dispensing room in position to be readily observed and reached by the dispenser. The means for forcing the beer or other liquid to be consumed out of the kegs or barrels 1 to the dispensing faucet on the floor above are purposely omitted for convenience in illustration, but it is understood any convenient means may be provided for this purpose, as, for example, the conventional air pressure pipe connections and means for this purpose.

I claim:

1. In a measuring and indicating means for the liquid contents of a receptacle, in combination, a spring suspended platform for carrying the receptacle, an electric supply circuit, a fixed resistance element having a variable part thereof connected across said circuit, means operable by said platform for varying said part of the resistance element, an electric meter and adjustable resistance connected in series with the rest of said fixed resistance across said circuit, said meter being calibrated in gallons of contents, means for controlling said circuit, a signal lamp adapted to be connected across said supply circuit, a yielding contact disposed in the circuit of said signal lamp and a member carried by said platform for engaging said yieldable contact at a predetermined point to light said signal lamp.

2. In a means for measuring and indicating the liquid contents of a plurality of receptacles, in combination, a spring suspended platform for each of said receptacles, an adjustable rheostat associated with each of said platforms, a separate means for each of said platforms and operated thereby for varying the resistance of its rheostat, a common electric supply circuit for said rheostats having one side connected with one end of said rheostats and the other side connected with said separate means, a separate control switch for each of said rheostats, an electrical meter connected across said rheostats, and a separate adjustable resistance in the circuit of said meter leading to each of said adjustable rheostats.

3. In a means for measuring and indicating the liquid contents of a plurality of receptacles, in combination, a spring suspended platform for each of said receptacles, an adjustable rheostat associated with each of said platforms, a separate means for each of said platforms and operated thereby for varying the resistance of its rheostat, a common electric supply circuit for said rheostats having one side connected with one end of said rheostats and the other side connected with said separate means, a separate control switch for each of said rheostats, an electrical meter connected across said rheostats, and a separate adjustable resistance in the circuit of said meter leading to each of said adjustable rheostats, a separate signal means for each of said platforms and means associated with each of said platforms for operating its signal at a predetermined point thereof.

4. In an apparatus of the character set forth, a base frame, a pair of vertical channel members spaced from each other and disposed with their channels facing each other, a platform and a vertically movable carriage carrying said platform, said carriage comprising a T frame with the web of the frame passing through the space between said channel members, said web carrying vertically spaced and horizontally offset guide rollers engaging the webs of said channel members as guide tracks, a bracket member extending upwardly from said channel members, spring means attached to the upper end of said bracket member and to said carriage for yieldingly suspending the carriage and platform, a rheostat carried by said channel members and an adjustable contact carried by said carriage for varying the resistance of said rheostat.

5. In an apparatus of the character set forth, a base frame, a pair of vertical channel members spaced from each other and disposed with their channels facing each other, a platform and a vertically movable carriage carrying said platform, said carriage comprising a T frame with the web of the frame passing through the space between said channel members, said web carrying vertically spaced and horizontally offset guide rollers engaging the webs of said channel members as guide tracks, a bracket member extending upwardly from said channel members, spring means attached to the upper end of said bracket member and to said carriage for yieldingly suspending the carriage and platform, a rheostat carried by said channel members and an adjustable contact carried by said carriage for varying the resistance of said rheostat, a vertically yielding contact also carried by said channel members and means carried by the carriage for engaging said contact at a predetermined point in the travel thereof.

6. In an apparatus of the character set forth, a base frame, a pair of vertical channel members spaced from each other and disposed with their channels facing each other, a platform and a vertically movable carriage carrying said platform, said carriage comprising a T frame with the web of the frame passing through the space between said channel members, said web carrying vertically spaced and horizontally offset guide rollers engaging the webs of said channel members as guide tracks, a bracket member extending upwardly from said channel members, spring means attached to the upper end of said bracket member and to said carriage for yieldingly suspending the carriage and platform, a rheostat carried by said channel members and an adjustable contact carried by said carriage for varying the resistance of said rheostat, a vertically yielding contact also carried by said channel members and means carried by the carriage for engaging said contact at a predetermined point in the travel thereof, the vertically movable contact being carried by a bolt having a sleeve and a compression spring for permitting yielding upward movement and an adjustable nut for determining the downward limit of movement of the contact.

7. In an apparatus of the character set forth a pair of vertical channel members, a platform and a vertically movable carriage carrying said platform, said carriage comprising a frame with rollers guided by said channel members, a bracket carried by said channel members, means whereby said carriage and platform are yieldingly suspended from said bracket and an indicator system responsive to the vertical movement of said carriage.

8. In an apparatus of the character set forth a pair of vertical channel members, a platform and a vertically movable carriage carrying said platform, said carriage comprising a frame with rollers guided by said channel members, a bracket carried by said channel members, means whereby said carriage and platform are yieldingly suspended from said bracket and an indicator system responsive to the vertical movement of said carriage, said bracket member forming a stop limiting the upward movement of the carriage.

9. In a measuring and indicating means for the liquid contents of a receptacle, in combination, a spring suspended platform for carrying the receptacle, an electric supply circuit, a fixed resistance element having a variable part thereof connected across said circuit, means operable by said platform for varying said part of the resistance element, an electric meter and adjustable resistance connected in series with the rest of said fixed resistance across said circuit, said meter being calibrated in gallons of contents, and means for controlling said circuit.

DAVID WALLACE ALCOTT.